United States Patent Office 2,861,341
Patented Nov. 25, 1958

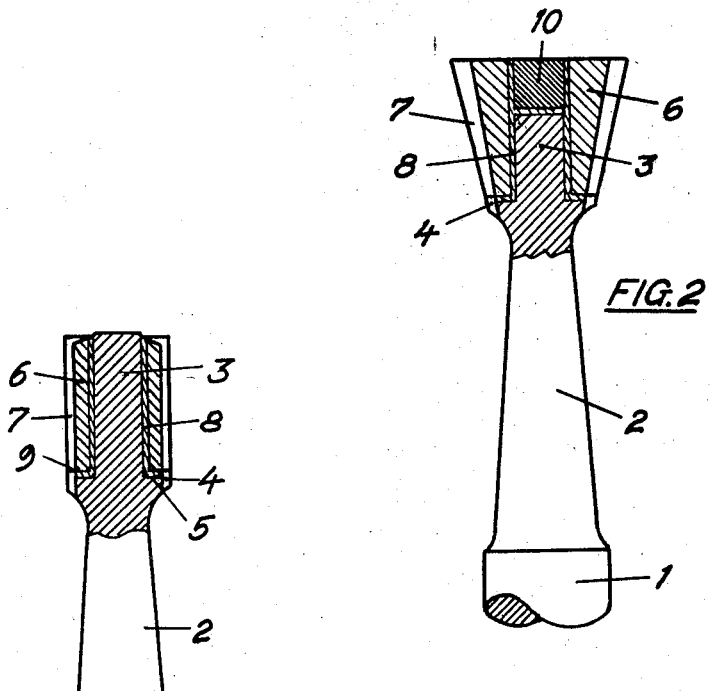
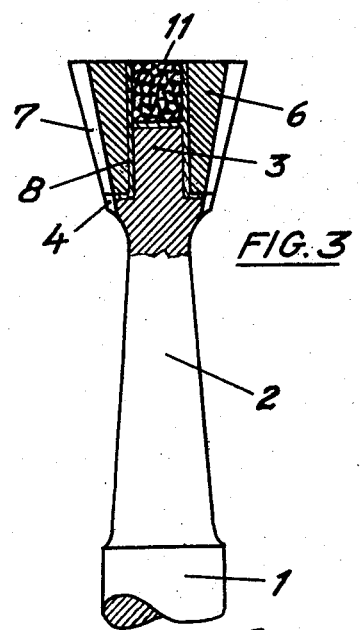
FIG. 1
FIG. 2
FIG. 3

2,861,341

DENTAL DRILLS

Gustaf Erik Bjorklund, Stockholm, Sweden, assignor to Aktiebolaget Dentatus, Hagersten, Sweden, a corporation of Sweden Application January 7, 1955, Serial No. 480,563

Claims priority, application Sweden January 13, 1954

3 Claims. (Cl. 32—48)

The present invention relates to dental drills of the kind in which the cutting element is formed of a hard but relatively brittle refractory metal, generally known under the name of hard metal, which is secured by means of brazing to a shank formed of relatively softer but less brittle metal such as steel.

In a known drill of this kind the hard metal element is provided with a recess or cavity extending through part of the element in axial direction thus forming a dead end hole in which the reduced end of the shank is inserted in spaced relation to the walls of the cavity. During the brazing operation the space between the reduced shank portion and the hard metal element is intended to be filled with brazing metal. The said space being closed on all sides but one, there will, however, be great risk of gas bubbles, arising from the heated fluxing material during the brazing operation, remaining in said space thus forming gaps in the brazed joint. Considering that the whole surface of the joint is in certain cases less than .002 sq. inch, it is evident that a very small bubble will reduce to a very high degree the strength of the joint. Furthermore, it is impossible to control the quality of the brazed joint, as one is not able to determine whether or not the brazing material has filled the space between the reduced shank portion and the hard metal element.

It is an object of the present invention to overcome these difficulties which is achieved by providing the hard metal element having cutting edges with a generally cylindrical channel or hole extending through the whole length of the element in axial direction, the shank of the drill being inserted in said channel and secured by brazing or soldering. The advantages thus obtained will be made more clear by the following description, reference being had to the accompanying drawing wherein like reference characters designate corresponding parts in the several views. In the drawing:

Fig. 1 shows on an enlarged scale a side elevation, partially in section, of the upper end portion of a dental drill according to one embodiment of the present invention, Fig. 2 shows a similar view of a further embodiment of the invention, and Fig. 3 shows a slightly modified execution of the drill shown in Fig. 2.

In Fig. 1 the numeral 1 represents the drill stem, the shank 2 of which is provided with a reduced end portion or projection 3. An intermediate portion between the shank and the projection is shaped as a collar or annular shoulder 4 the upper surface of which has an annular groove 5 close to and around the projection. The hard metal element 6 is provided with cutting edges 7 on the outer surface and his a central channel or hole dimensioned to accommodate the projection 3 and extending through the whole length of the element in axial direction. The projection of the shank is inserted in this channel and secured to the hard metal element by brazing, whereby the space between the projection and the inner wall of the element as well as the annular groove 5 is filled with brazing metal 8. The periphery 9 of the collar or shoulder 4 abuts directly against the lower end surface of the hard metal element or is separated therefrom only by a very thin layer of brazing metal.

In the embodiment shown in Fig. 1 the projection 3 has about the same length as the channel of the hard metal element, so that it completely fills the whole channel. The drill stem being made of steel or other comparatively soft metal, the end surface of the projection, which is on a level with the upper end surface of the hard metal element, will be rapidly worn during the drilling operation. In the embodiment shown in Fig. 2 the projection is therefore made shorter than the channel, so that it completely fills only the lower portion of the channel, a piece of hard metal 10 being inserted and secured by brazing in the upper portion of the channel. By this means the upper surface of the drill will be very resistant against wear and may also be provided with ground cutting edges.

In the modified embodiment shown in Fig. 3 a body of hard metal grains 11 soldered or brazed together is substituted for the hard metal piece 10 shown in Fig. 2.

The brazing is carried out in such a manner that the drill stem 1 is arranged in vertical position, the projection 3 being turned upwardly, whereupon the hard metal element 6 is applied to the projection, a washer of brazing metal being placed between the lower end of the element and the collar or shoulder 4. In case of a short projection, such as shown in Figs. 2 and 3, a hard metal piece 10 is put in the empty space of the channel above the projection, or such space is filled with grains 11 of hard metal. The flux is thereafter applied to the upper end surface of the drill in the form of powder or a solution. After that, the drill is heated in a furnace to a temperature above the fusing point of the brazing metal, at which the flux is first fused and fills the space between the inner surface of the channel on the one hand and the projection 3 and possibly the hard metal piece 10 or the hard metal grains 11 respectively on the other hand and possibly also between the projection 3 and the hard metal piece 10 or the grains 11 respectively. When the brazing metal is fused, it will be drawn up into and completely fill the said space by capillary force. It is understood that the size of the washer initially applied to the projection must be large enough to fill the space in fused state. When the brazing metal is drawn up into the space, the surplus of flux together with possibly formed gas is forced upwardly in the channel and escapes through the annular opening formed on the upper end of the drill around the projection or hard metal piece respectively. The space intended to be filled with brazing metal being open upwardly as well as downwardly, there will be very little risk of gas bubbles remaining therein after the brazing operation. Moreover, it is possible, by means of microscopic examination of the upper end surface of the drill, to ascertain that the whole of the annular opening formed around the top of the projection 3, the hard metal piece 10 of the grain body respectively is filled with brazing metal, in which case the brazed joint is in all cases dependably without effect.

The hard metal element shown in Fig. 1 is cylindrically annular in shape and in Figs. 2 and 3 it has the form of an inverted annular cone, but it may be of any suitable shape or size. The element is formed from a relatively hard refractory metal, such as sintered tungsten or tantalum carbide or other hard metallic carbides or alloys of a similar nature. Each element may be formed individually by a pressing and sintering operation, but it is also possible to cut several elements from a previously formed tube or pipe of hard metal as is easily understood by any competent person skilled in the art. The elements are preferably formed with substantially smooth exterior surface in which the cutting edges are cut or ground after uniting the element with the drill stem.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not limitation, and it is not intended to limit the invention claimed herein beyond the limitations imposed by the state of the prior art.

What I claim is:

1. A dental drill comprising a cutting element of a hard but comparatively brittle metal having cutting edges on the exterior surface thereof, a channel or hole extending in axial direction through the whole length of said element, a shank of relatively softer and less brittle metal having a reduced end portion forming a projection inserted in the channel of said element and in spaced relation to the walls thereof, a layer of brazing metal uniting the projection of said shank and said element, said projection having less axial length than the channel in which said projection is inserted, and a piece of hard metal arranged in said channel outside the free end of said projection and in spaced relation to the walls of the channel, a layer of brazing metal uniting said piece of hard metal and said element.

2. A drill as defined in claim 1, in which grains of hard metal are arranged in said channels outside the free end of said projection, said grains being united together and to the walls of the channel by intermediate brazing metal.

3. A drill as defined in claim 1, in which said shank is provided with an annular shoulder close to said projection which abuts against one end of said element and the surface of said shoulder facing said end of said element is provided with an annular groove close to and around said projection, said groove being filled with brazing metal uniting said shoulder and said element.

References Cited in the file of this patent

UNITED STATES PATENTS

| | | |
|---|---|---|
| 820,474 | Buchanan | May 15, 1906 |
| 2,334,755 | Eglinton | Nov. 23, 1943 |